United States Patent
Clark et al.

(10) Patent No.: US 6,401,217 B1
(45) Date of Patent: Jun. 4, 2002

(54) METHOD FOR ERROR RECOGNITION IN A PROCESSOR SYSTEM

(75) Inventors: Mark Clark, Munich; Erich Sonnenschein, Planegg, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/120,786

(22) Filed: Jul. 22, 1998

(30) Foreign Application Priority Data

Jul. 22, 1997 (EP) .............................. 97112557

(51) Int. Cl.[7] .......................................... H03K 19/003
(52) U.S. Cl. .............................. 714/20; 714/15; 714/47; 714/48; 714/57
(58) Field of Search ............................. 714/12, 4, 15, 714/13, 44, 48, 47, 57, 20, 704, 759, 758, 760

(56) References Cited

U.S. PATENT DOCUMENTS 5,119,377 A * 6/1992 Cobb et al. ................... 714/38
5,237,677 A * 8/1993 Hirosawa et al. ............. 714/57
5,740,354 A * 4/1998 Ben-Natan et al. ........... 714/45
6,000,046 A * 12/1999 Passmore ...................... 714/57
6,105,150 A * 8/2000 Noguchi et al. .............. 714/44

FOREIGN PATENT DOCUMENTS

EP    0 403 415        12/1990
EP    0 735 477 A1     10/1996

* cited by examiner

Primary Examiner—Richard Hjerpe
Assistant Examiner—Mackly Monestime
(74) Attorney, Agent, or Firm—Schiff Hardin & Waite

(57) ABSTRACT

The method enables an improved and faster error recognition of software errors in a processor or processor system in which programs subject information received from other programs to an error check, particularly to a plausibility check, and, given acquisition of error statuses, output a corresponding error message to the operating system. This error message contains an indication of the other program generating the faulty information and is stored in a respective error message table. The operating system thus learns of programs suspected of working in a faulty way from other programs collaborating with these programs, so that program errors can be recognized and localized significantly faster.

9 Claims, 8 Drawing Sheets

| TYPE OF ERROR | SWERR/ SWNC | CORRECTIVE ACTION | ERROR INDICATION (CONVERSION ROUTINE) |
|---|---|---|---|
| PROBLEM NOT SPECIFIED | ARBITRARY | ARBITRARY | ARBITRARY |
| MESSAGE UNKNOWN | SWERR | IGNORE MESSAGE | ONCONV6_PID |
| INVALID MESSAGE PARAMETERS | SWERR/ SWNG | END TASK, IGNORE MESSAGE, END SERVICE EVENT | ONCONV6_PID ONCONV0_NO_BLAMING |
| MESSAGE | SWERR | END TASK, IGNORE MESSAGE, END SERVICE EVENT | ONCONV6_PID ONCONV0_NO_BLAMING |
| MESSAGE MISSING | SWERR 1) | END SERVICE EVENT | ONCONV2_UBI ONCONV1_BUFFER ONCONV4_SERVER |
| RESPONSE MISSING TO REMOTE PROCEDURE CALL ERROR MESSAGE FOR REMOTE PROCEDURE CALL | SWERR 2) | END TASK, END SERVICE EVENT | ONVONV3_ REMOTE_PROCEDURE |
| COMMUNICATION PATH NOT CREATED | SWERR 2) | END TASK, END SERVICE EVENT | ARBITRARY, EXCEPT ONVONV0_NO_BLAMING |
| TEMPORARY DATA MISMATCH | SWERR | ARBITRARY, EXCEPT "CORRECTIVE ACTION NOT POSSIBLE" | ONVONV0_NO_BLAMING |
| SEMI PERMANENT DATA MISMATCH | SWNG | ARBITRARY | ONVONV0_NO_BLAMING |
| CRITICAL RESOURCE PROBLEM | SWERR | END TASK, END ACCESS, IGNORE MESSAGE | ONVONV0_NO_BLAMING |

1) AFTER RENEWED ATTEMPT
2) AFTER RESPONSE "TIME EXCEEDED" AND RENEWED ATTEMPT

| ERROR TYPE | SUP_SWERR SUP_SWINC SUP_SWTRAP SUP_SWREC | CORRECTIVE ACTION | ERROR INDICATION (CONVERSION ROUTINE) |
|---|---|---|---|
| PROBLEM NOT SPECIFIED | ARBITRARY | ARBITRARY | ARBITRARY |
| INVALID USER SOFTWARE PARAMETERS | ARBITRARY | EVENT REJECTED, EVENT IGNORED | ONCNVP6_PROCESS |
| INVALID SUPERVISOR SOFTWARE PARAMETERS | ARBITRARY | EVENT REJECTED, EVENT IGNORED | ONCNVPO_NO_BLAMING |
| INVALID PARAMETERS DETECTED BY CALLED SOFTWARE | ARBITRARY | EVENT REJECTED, EVENT IGNORED | ONCNVPO_NO_BLAMING |
| EVENT OUTSIDE SEQUENCE | SUP_SWINC | EVENT REJECTED, EVENT IGNORED | ARBITRARY |
| TEMPORARY DATA MISMATCH | SUP_SWERR | EVENT REJECTED, EVENT IGNORED NO CORRECTIVE ACTION POSSIBLE | ONCNVPO_NO_BLAMING |
| SEMI PERMANENT DATA MISMATCH | SUP_SWERR SUP_SWINC SUP_SWREC | ARBITRARY | ONCNVPO_NO_BLAMING |
| CRITICAL RESOURCE PROBLEM | SUP_SWERR SUP_SWINC SUP_SWREC | ARBITRARY | ONCNVPO_NO_BLAMING |
| RESOURCES NOT RECEIVED | SUP_SWINC | EVENT REJECTED, EVENT IGNORED | ONCNVPO_NO_BLAMING |
| MESSAGE NOT SENDABLE | SUP_SWINC SUP_SWREC | EVENT REJECTED, INFORMATION LOST EVENT IGNORED | ONVONVP6_NO_PROCESS |

FIG. 3

| ERROR SIGNALING TYPE | SPECIFIC INFORMATION | MINIMAL RESTART STAGE | FILTER PROVIDED | STATISTICS USED |
|---|---|---|---|---|
| SWERR | SWERR-ID PID | *NORMAL: NONE<br>*IF THE NUMBER OF SWERRs EXCEEDS THE THRESHOLD VALUE:<br>*IF THE NUMBER OF SWERRs PER PROCESSOR EXCEEDS THE THRESHOLD VALUE: POREC3 | YES | *SWERR-ERROR STATISTICS<br>*SWERR-FILTER STATISTICS<br>*GLOBAL FILTER STATISTICS<br>(*STARTUP STATISTICS, IF THE THRESHOLD VALUE IS REACHED) |
| SWNC | SWNC-ID PID | NONE (SWNCs NEVER CAUSE A RESTART) | YES | *SWNC-FILTER STATISTICS<br>*GLOBAL FILTER STATISTICS |
| SUP_SWERR | SUP_SWERR-ID MODULE NAME [PID SIGNALED AS FAULTY] | *NORMAL: NONE<br>*IF THE NUMBER OF SWERRs PER MODULE EXCEEDS THE THRESHOLD VALUE: FULLREC<br>*IF THE NUMBER OF SUP_SWERRs PER PROCESSOR EXCEEDS THE THRESHOLD VALUE: FULLREC<br>*THE PROCESS SIGNALED AS FAULTY IS COUNTED IN THE SWERR-STATISTICS | YES | *SUP_SWERR-ERROR STATISTICS<br>*SUP_SWERR-FILTER STATISTICS<br>*GLOBAL FILTER STATISTICS<br>(*SWERR-ERROR STATISTICS ONLY IF SUP_SWERR SIGNALS A PID AS FAULTY<br>(*STARTUP STATISTICS, IF THRESHOLD VALUE IS REACHED) |
| SUP_SWNC | SUP_SWNC-ID MODULE NAME | NONE (SUB_SWNCs NEVER CAUSE A RESTART) | YES | *SUP_SWNC-FILTER STATISTICS<br>*GLOBAL FILTER STATISTICS |

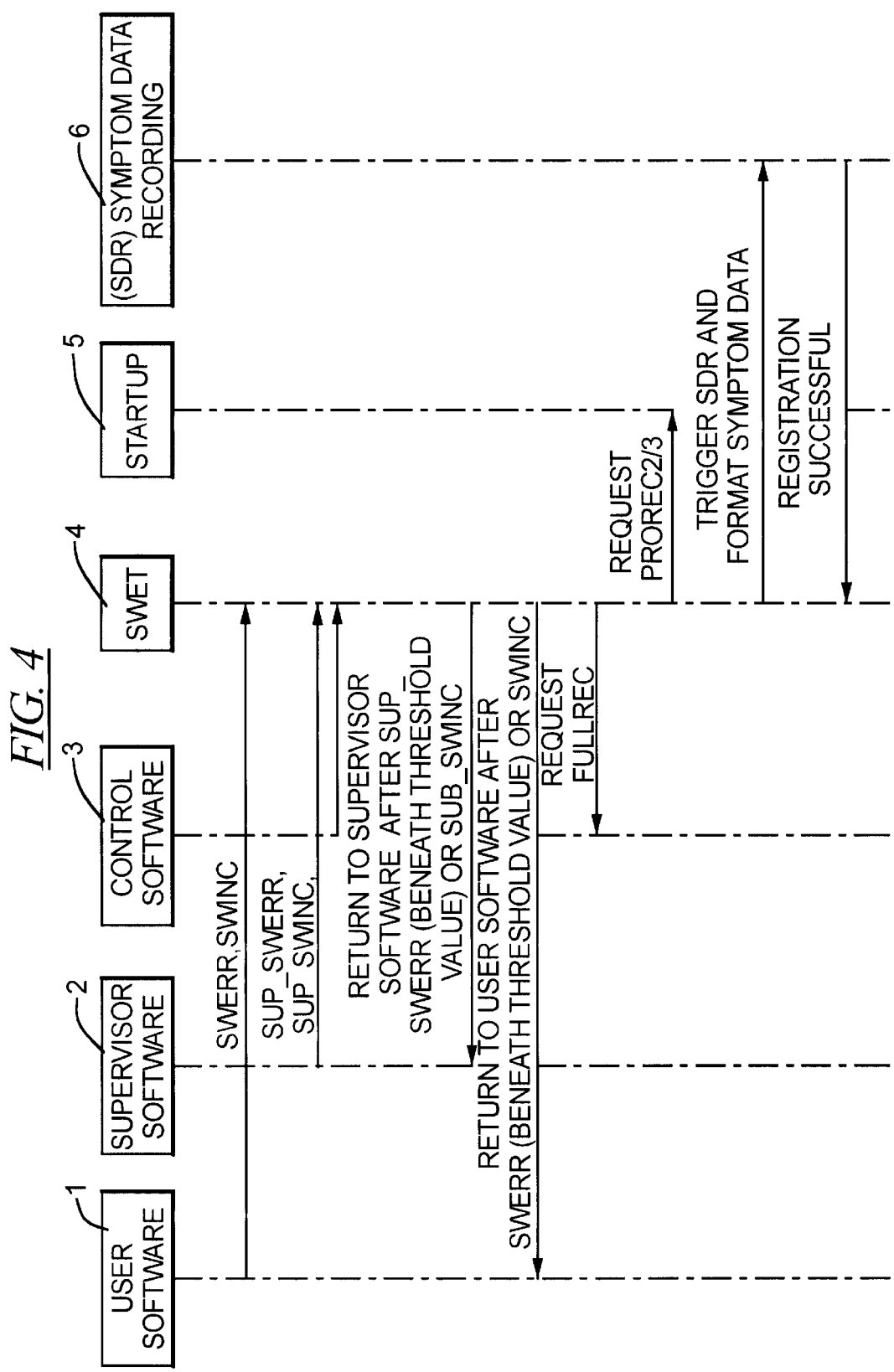

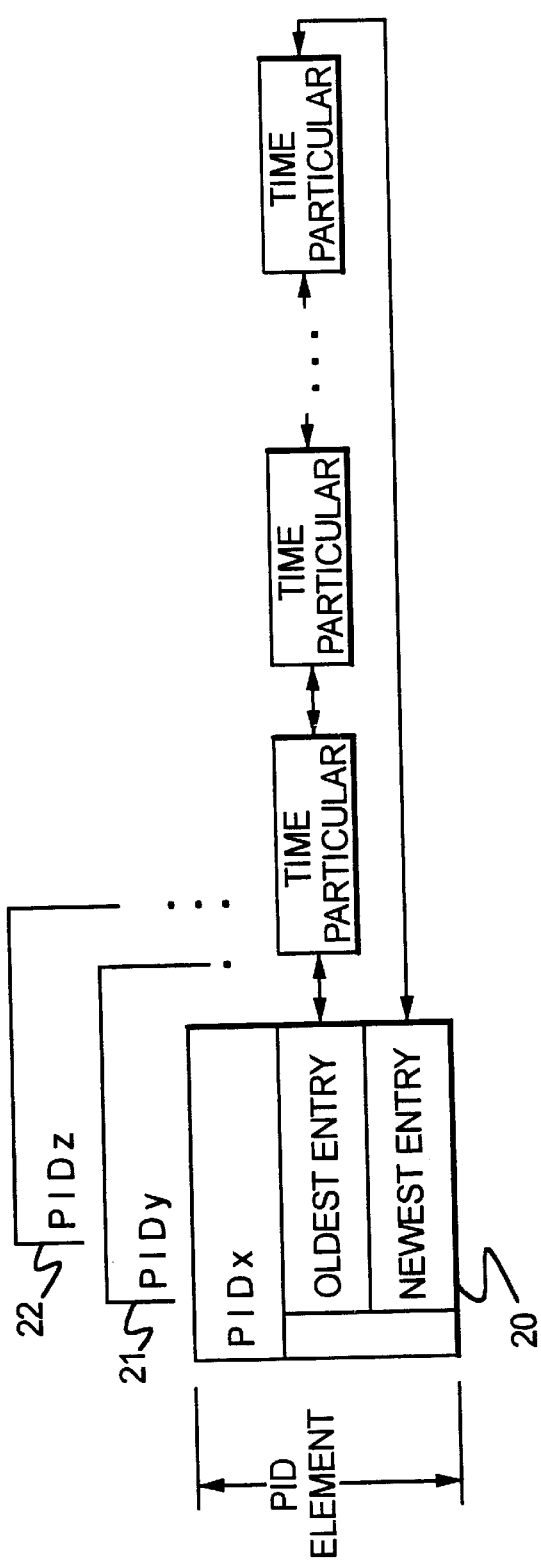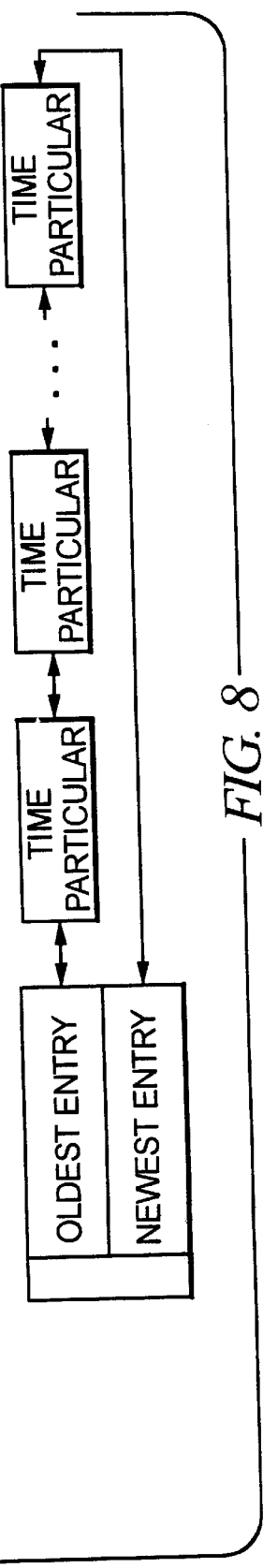
FIG. 8

METHOD FOR ERROR RECOGNITION IN A PROCESSOR SYSTEM

BACKGROUND OF THE INVENTION

The present invention is directed to a method for error recognition in a processor system working with a plurality of programs and containing at least one processor.

Software errors are largely unavoidable given processor systems with extensive software equipment. So that the running of the programs and the operation of the overall processor system, however, is not too greatly deteriorated overall by such software errors, an optimally fast recognition of software errors, i.e. program errors, is desirable since the software errors can lead to malfunctions up to and including a complete resetting of individual programs or even of the entire processor system. The down times caused by such software errors must be minimized, particularly in real-time systems such as, for example, electronic switched systems for a telecommunications that represent a preferred but not exclusive area of employment of the present invention.

For improved error recognition and handling, one could consider resetting a process that generates an error message in order to thereby eliminate the error problem. Alternatively, one could also consider resetting the complete processor and to have it start up again, particularly when the number of error messages of a processor has exceeded a predetermined threshold. Given such a procedure, however, a resetting generally occurs to too great an extent, since programs that are working error-free are also reset and, thus, the performance capability of the overall processor is deteriorated.

SUMMARY OF THE INVENTION

It is an object of the present invention to provide a method for error recognition in a processor system working with a plurality of programs and containing at least one processor with which an improved recognition of incorrectly working programs is possible.

Advantageous developments of the invention are recited in the subclaims.

In the inventive method, error recognition checks, particularly plausibility checks in view of the date with which the respective programs work and which they have obtained from other programs are implemented by at least one program within the processor system preferably working in real time. As a result thereof, errors can be recognized, so that an error propagation can be prevented. When the plausibility check, which can ensue in a traditional way, shows that the received information (data) is inconsistent, i.e. is to be classified as being faulty, this program outputs an error message to the operating system. An error message table is updated in conformity with this error message in the operating system, information about the programming outputting the faulty data and classified as faulty and computationally, information about the reporting the reporting program as well being registered therein. The reporting process thus also provides a pointer to the suspected source of error i.e., to another program. As a result thereof, the system acquires improved overview information over programs that may possibly be incorrectly working and can, for example, compile characteristic data for the reporting program and for the program reported as faulty in order to thereby enable an improved error isolation, and can also be implement a statistical evaluation, particularly a summing-up of the plurality of error messages selectively for each program. The operating system can initiate suitable error elimination measures, for example, a resetting of a program repeatedly reported as faulty, or can also initiate a resetting of the entire processor when necessary.

A more exact recognition and determination of the requirement for corrective measures, particularly of individual program resettings or a start-up to a greater extent that are required for returning the system to full performance capability, can thus be achieved with the present invention. The inventive method thus allows an optimized acquisition of programs to be reset due to faulty behavior. This ensues in that a program or the higher-ringing operating system as well is provided with the possibility of, so to speak pointing to another program and accusing this of being faulty. As a result thereof, the scope of potentially required resettings is limited to the necessary degree and an unnecessary resetting of a great plurality of processes or, potentially, of the entire processor or even of a system containing a plurality of processors can be avoided.

The user software thus contains a specific reporting possibility, so that it can provide the operating system with indications what process is potentially faulty. On the basis of this error message, the operating system can localize the other process that is to be potentially reset. This need not necessarily be the process reported as faulty but can also be another process that drives this process or ranks higher than this process. In any case, the operating system can likewise identify the identity of the process that generated the error message, preferably system-wide in an unambiguous way. The operating system can implement this process identification for a broad plurality of interfaces, for example of transmitted messages, remote procedure calls, etc.

The capability of the user processes, i.e. the user software running on the lowest interrupt level zero, of classifying another process as faulty is thereby directed to the programs and interface partners coming into consideration as possible candidates. The possibility that user processes incorrectly classified other processes as faulty is thereby diminished by utilizing compiler-based rules dependent on the nature of the problem and on the nature of the interface.

Since the operating system stores information both about the reporting program as well as about the program referred to as faulty in the error message table, the functioning of the inventive method can preferably be configured such that the operating system resets a program and allows it to start up again as soon as the plurality of messages stored for this program (plurality of error messages that a program output or a plurality of error messages that point to a program as faulty) reaches a predetermined threshold. As a result thereof, the probability of finding the process to be in fact reset due to faulty behavior is clearly enhanced.

The inventive method can also be configured such that, given a system with a plurality of processors or, respectively, with a plurality of platforms as present given an electronic switched system for telecommunications, the operating system transports error message information or other accompanying information that allow error isolation on a platform from its own platform to another platform on which the process suspected to be faulty is in fact running.

The error message output by a program can cause the operating system to identify the identity of the indicated program classified as faulty and to immediately store it in the error message table. Alternatively, the error message can first be interpreted only as a call in response whereto the operating system hands the information about the identity of the program suspected as being faulty back to the reporting program, after which these information are then handed over from the reporting program to the error message table, which is preferably located in the operating system. The information about the respective program is thereby preferably located in a data frame containing the data classified as faulty, particularly in the form of an information header.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 1 and 2 show overview tables of specific error types and the reactions thereby triggered;

FIG. 3 shows an overview table for illustrating the significance of the individual error messages;

FIG. 4 generally shows the information flow in an error recognition given the exemplary embodiment;

FIG. 8 shows the structure of an embodiment of an error message table.

DESCRIPTION OF THE PREFERRED EMBODIMENTS

Figure 5:
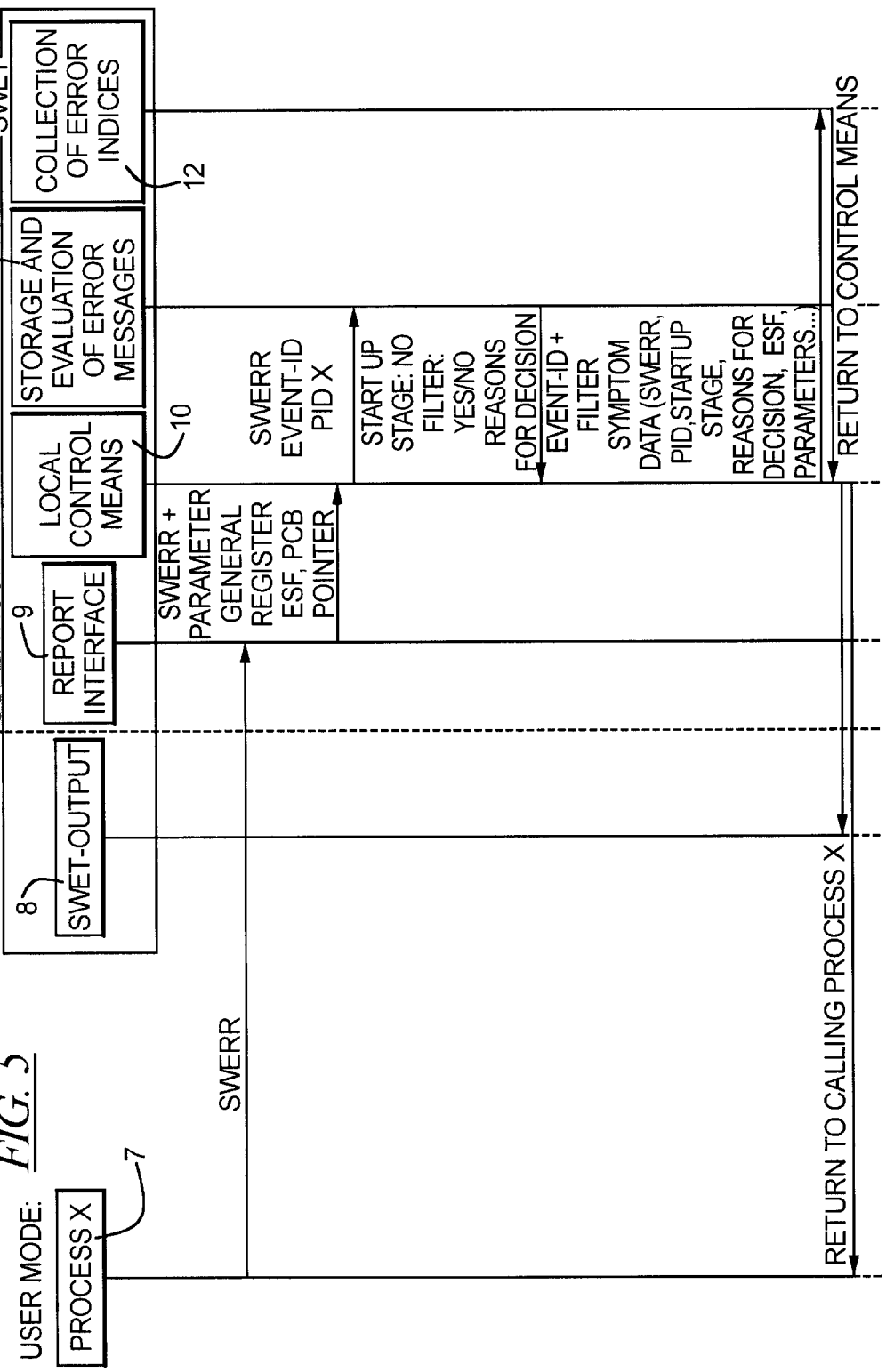
FIGS. 5 and 6 show flow charts given error messages.

FIG. 1 shows an overview table of error types, respective error messages and direct correction events for the user programs running on the interrupt level 0 (user software), whereas FIG. 2 shows a similar overview table for the supervisor programs running on a higher interrupt level. The correct employment of the respectively indicated actions is assured by appropriate tool programs.

The entries present in the right-hand column of the respective tables indicate the identification calls that serve for the reporting and/or recognition of another program classified as faulty.

Upon reception of data/messages, the receiving program implements a plausibility check in view of the data content and/or a check of the time frame for the data reception and can thereby recognize errors. When the program generating the data/messages classified as faulty runs on the user level, the receiving program, which is likewise running on the user level, can directly report these to the operating system as faulty. To this end, specific, different error messages SWERR or SWINC are provided, these being directed to the supervisor level. When a message that is actually expected is not obtained (message missing) can also be recognized and an error message can also be generated in such a case. The conversion routines recited below are thereby prescribed for more exact specification of the software classified as faulty, these being respectively entered in the right-hand column in FIGS. 1 and 2:

"ONCONV0_NO_BLAMING" converts the prescribed value for "no error message". This conversion routine is always used when no error indication to a different program is to be output; "ONCONV1_BUFFER" converts the buffer to be indicated by the error message into a buffer identification that identifies this buffer and its position;

"ONCONV2_UBI" converts the specific buffer identification (unique buffer identifier) into an identifier that indicates the buffer identifier and its position to be reported due to a suspected error; "ONCONV3_REMOTE_PROCEDURE" converts the procedure to be reported as being suspected of being faulty and that is running remote into a corresponding procedure identification that identifies the buffer identification (unique buffer identifier) for the procedure running remote and its position;

"ONCONV4_SERVER" converts the server classified as faulty (or, respectively, the service communication path classified as faulty) into a communication path identification that identifies the service event and its position;

"ONCONV5_SERVICE" converts the service into a service identification that identifies the service event or events classified as faulty and its position or, respectively, positions; and "ONCONV6_PID" converts the processor identification PID into a process identification that identifies the process event or, respectively, the process in the service provision unit SPU and its position.

An error reference to another program can only ensue in common with a call SWERR or SWINC, whereby the respective conversion routine must be directly contained in the call SWERR or SWINC. An employment of one of these conversion routines without the call SWERR or SWINC is not classified as an error message or, respectively, error indication.

The tables in FIGS. 1 and 2 are self-explanatory in and of themselves and unambiguous, so that no further explanation is required. For example, given reception of an unknown message (see FIG. 1, first column "error type", second table 1), the error message SWERR is generated and the conversion routine "ONCONV6_PID" is used in order to identify the process generating the unknown message and reported to the operating system. As current error correction for this error message, the message is simply also ignored at the program side. When, by contrast, the error type "temporary data mismatch" occurs, the error message SWERR is generated but the prescribed conversion routing "ONCONV0_NO_BLAMING" is selected, so that no error reference to a process ensues in this case since this error type does not allow an unambiguous allocation to an error source. The currently implemented correction procedure can thereby be arbitrary, with the exception of the classification as "no correction procedure,". It can be seen from the tables in FIGS. 1 and 2 that the user software respectively generates the error messages SWERR or SWINC, by contrast whereto the corresponding error messages are referenced SUP_SWERR or, respectively, SUP_SWINC at the supervisor software. The supervisor software can also generate other error message types that respectively compel a partial or complete resetting and restart of the processes or of the entire processor or, respectively, in the extreme case, even if the entire processor system comprising a plurality of processor units.

FIG. 3 shows the individual error message types SWERR, SWINC, SUP_SWERR and SUP_SWINC as well as their respective effect and the error message tables employed.

Before a more detailed description of the table according to FIG. 3, the terms employed here shall be summarily defined. What are to be understood by "user software" or, respectively, "user programs" are all those programs that run in the user mode, i.e. on the interrupt level 0. "Supervisor software" or, respectively, "supervisor programs" refers to all programs that run in higher interrupt levels above zero (supervisor mode). The entire software that runs on a platform in an electronic switched system for telecommunications can thereby also be potentially subsumed under "user programs". Such user programs then work upon employment of the user software and of the supervisor software. Further, "software programs" include all software problems that are identified as a negative result of a check during normal processing of a message and effect that the software cannot fulfill the desired function. All software problems are thereby not reported to a software error handling software (section) provided in the processor; rather, reports can also be made to other components suitable for error elimination or registration dependent on the respective type of error. The invention is thereby designed such that users, i.e. persons or devices working with the user software, must neutralize the recognized error in a certain way on the basis of a corresponding correction event (for example, by ignoring the message, by initializing the data, etc.). However, corresponding error messages are additionally generated and listed in a corresponding error message table (particularly in filter statistics (tables), global data files, archive data files, etc.).

What are meant by "software incidents" or, respectively, "software events" are software problems (abbreviated as SWINC) that are produced by specific system statuses such as, for example, overload, overlapping events, etc., and probably can be neutralized neither by the user programs themselves nor by centralized control measures such as, for instance, a resetting with restart. Software events also include software problems that are not clear software errors (for example, cases wherein it is not clear whether they are actual software errors or cases for which it is expressly defined that a centralized, automatic error correction is to be realized in a different way than by acquiring them in an error message table). For example, this can thereby be a matter of problems due to inadequate system resources. "Software errors" (SWERR) are software problems that are reported to the software error handling software and derive from software errors in the coding or in the interpretation (for example, "bugs"). The communication of a software error can be to a corresponding error handling by resetting when it derives on the basis of the error message table that the error occurs repeatedly.

In the present invention, the programs are preferably designed such that, even after outputting an error indication to different process that is probably working incorrectly, they themselves can continue to work undisturbed in that they correspondingly evaluate, for example ignore, the received, faulty message or, respectively, the software error acquired in some other way and then continue their normal operation. This similarly applies to the supervisor software.

In the present invention, the error message can be output from the calling process or from the called procedure. The error message is preferably output by the calling process upon identification of an error condition, since the calling process usually also has additional context information about the called process and the identified error.

Further, invalid parameters in a call of a procedure need not always be caused by a software error. This can be determined best by the calling processor, so that the probability of generating an incorrect error message is further diminished. Further, a procedure is usually multiply called within a loop. If this procedure itself were used for generating the error message, repeated error messages would be output in every loop, so that the operating system would be more heavily loaded and can thus not distinguish whether this is thereby a matter of respectively new errors or a matter of the repetition of an identical error. When, by contrast, the calling procedure outputs the error message, it can first collect the recognized errors or, respectively, inconsistencies at every call of the called procedure and generate a single error message SWERR or SWINC only after the conclusion of the loop.

An error message can also be formed when a possibility check (Plausi-Check) implemented by the user software leads to the suspicion that semi-permanent data are faulty (in case, for example, two semi-permanent values are compared to one another and exhibit unanticipated deviations or when a semi-permanent value is located outside the allowable range). In this case, the user program outputs an error message SWERR or SWINC that signals a problem in view of the semi-permanent data, whereby this data can be identified and analyzed off-line in this case.

The following messages are thus offered for the software error handling software (SWET):1.) "SWINC": this call makes it possible for the user software to report software events proceeding from the process level. No error elimination measures whatsoever such as, for instance, a resetting are thereby effected. In this case, the software error handling software collects and stores references that are related to the reported software event. No error statistics [error message table) need be offered for the reported SWINCs. 2.) "SWERR" references a call or, respectively, an error message that is available to the user software for reporting software errors proceeding from the process level. An immediate recuperation event is not thereby effect; rather, the user himself must come to terms with the acquired error. In this case, the software error handling software collects indications that are related to the reported software error. The call contains the possibility of informing other user software (processes) as faulty. 3.) The message "SUP_SWINC" offers the same functional scope for the supervisor software as the call "SWINC" for the user software. 4.) The command "SUP_SWERR" likewise corresponds to the functional scope of the call "SWERR" of the user software for the supervisor software. In this case, many statistics are likewise built up for the reported error. The entire process is reset when a threshold defined by the software error handling software is reached. Here, too, there is the possibility of pointing to other software classified as faulty.

As can be seen from the table in FIG. 3, SWERR error message tables (SWERR error message table) as well as SWERR filter tables or, respectively, filter statistics and global filtered statistics as well as, potentially error illumination statistics are provided for the error message SWERR, these to be explained in yet greater detail below with reference to FIGS. 7 and 8. The left-hand column in FIG. 3 respectively indicates the error message type, whereas the specific information sent with the error message is shown in the second column. The minimum restart level due to an error message is listed in the middle column. The fourth, indicates whether the error messages were respectively subjected to a filtering, whereby the respectively addressed tables or, respectively filters are indicated in the right-hand column. The error message SWERR not only contains its own identifier for the reporting process but also contains the identifier PID for the process classified as faulty. The same is also true of the error message SWINC. The error message SUP_SWERR of the supervisor software likewise contains its own identifier as well as the module name, i.e. the process identification of the module classified as faulty. This likewise applies to the error message SUP_SWINC. Normally, none of these messages leads to an immediate resetting of processes or a startup of the processor. When, however, the plurality of error messages SWERR per PID exceeds the internally prescribed threshold. The process reported as faulty is initially reset and the corresponding buffer is erased. If the overall plurality of error messages SWERR per processor were to exceed the threshold, all processes of this processor are reset and the corresponding buffers are erased. As can be seen from FIG. 3, a similar handling also occurs given the error messages SUP_SWERR. Error messages SWINC or SUP_SWINC, however, do not lead to a resetting.

The information flow given the described exemplary embodiment of the present invention is shown in FIG. 4. Upon recognition of a process potentially working in a faulty way or, respectively, of some other kind of software problem, the user software 1 generates an error message SWERR or, respectively, a problem message SWINC that is supplied to a software error handling section 4. In a similar way, the supervisor software 2 generates the messages SUP_SWERR or, respectively, SUP_SWINC given corresponding statuses in the supervisor level that are likewise conducted to the software error handling section 4. These indications are stored in corresponding message tables in the software error handling section 4, which shall be described in greater detail later, whereupon the executive sequence returns to the reporting user software or, respectively, potentially, the reporting supervisor software insofar as the plurality of error message indicating a specific process or deriving from a specific process has not yet reached the threshold. When, by contrast, the threshold is reached, the software error handling section 4 requests either a complete resetting of the overall software in a processing platform of the switched system or (dependent on the nature of the multiply reported error) initially begins with a resetting only of the process reported as faulty or of all processes of this processor, this being accomplished by a startup software 5. Further, an additional data registration software 6 for registering accompanying error indices is provided, this being triggered as needed by the software error handling software 4 and forwarding the error indication data it has secured to the software error handling software 4 for immediate storage.

FIG. 5 shows the case of handling an error message SWERR that does not require a resetting of the process or of other processes. Individual sub-sections of the software error handling software 4 as well as their allocation to the user level or, respectively, to the supervisor level are thereby shown in greater detail, namely the output section 8, a report interface 9, a local control means 10, a section 11 for storing and evaluating error messages that contains the error message tables, and a section 12 for collecting error indications.

Figure 6:
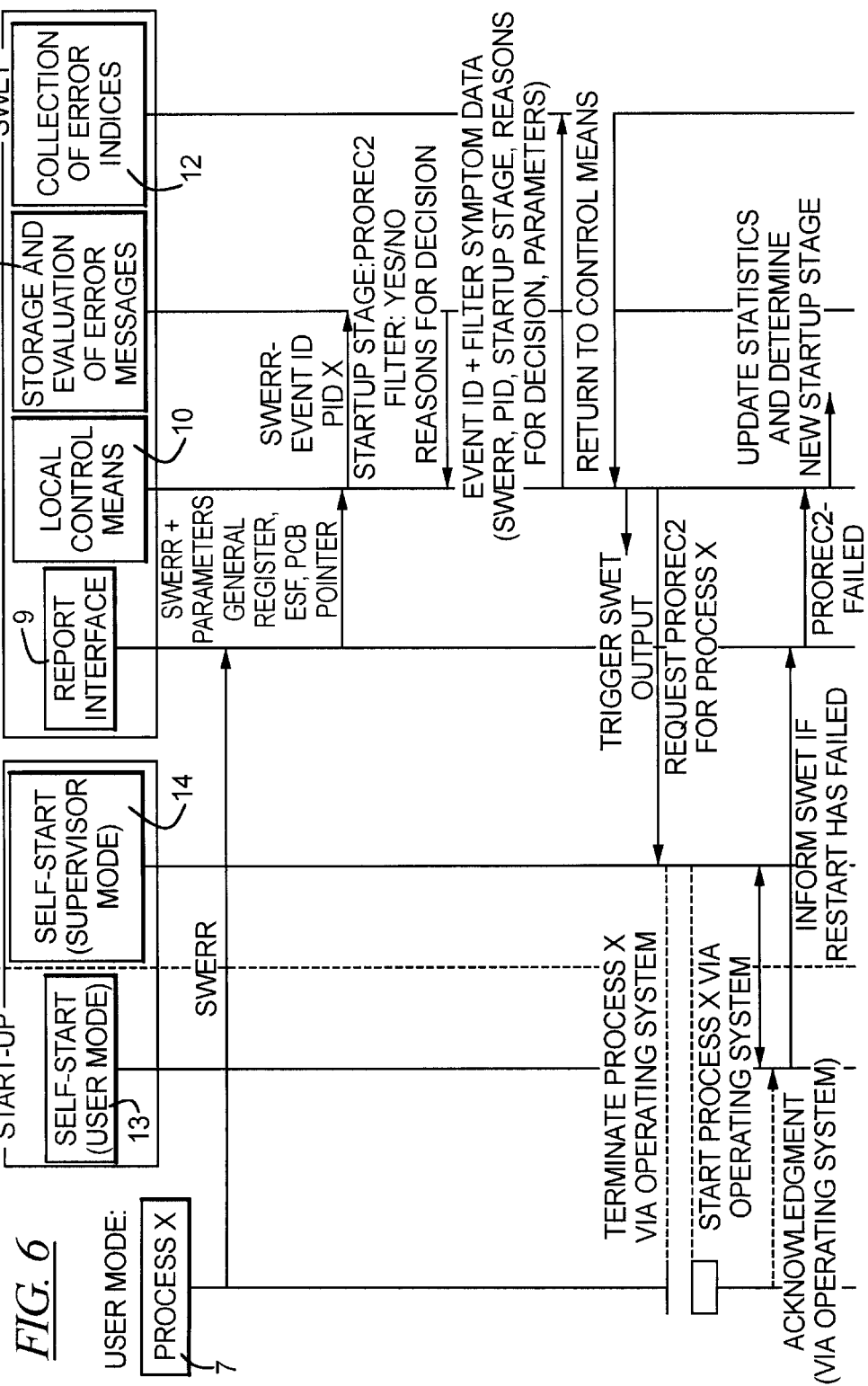

When a process x (reference 7) generates an error message SWERR, this is accepted via the interface 9 into the software error handling section 4, which then outputs this error message as well as appertaining parameters, etc. to the local control means 10. Subsequently, the error message is forwarded to the section 11 together with a corresponding error event identifier and the identifier PID in the process x for the reporting processor. Since it is assumed in the present case that no process restart or some other error illumination measure is required, the section 11 returns the information to the control means 10 to the effect that no resetting is required. Further, the output message also contains an indication about the fact whether a filtering of the data has been undertaken, and a brief information about the reason for the decision that was made. This data can be facultatively forwarded to the section 12 for a later, improved error analysis, whereupon the program execution then returns to the local control means 10. Finally, a return is made from the control means 10 to the called process x, so that the processing sequence triggered by the error message SWERR has been ended. FIG. 6 shows the alternative case that an error message SWERR is generated that leaves to a reset event because the error message threshold has been reached. As in FIG. 5, the process x can thereby be a matter of the process generating the error message or a matter of that process that the reporting process reports as faulty.

Since a process resetting is implemented in this case, programs 13 and 14 for the implementation of the resetting and of the restart for the user mode or, respectively, for the supervisor mode are shown. The upper half of the executive sequence according to FIG. 6 is identical to that according to FIG. 5, with the single exception that the section 11 now reports the resetting of the process x to the control means 10 as the necessary reaction. Stated more precisely, the section 11 outputs a message to the control means 10 that prescribes the startup level, which here is initially composed only of a resetting of the process x. Instead of the return to the calling process x provided as last step according to FIG. 5, the control means 10 outputs a trigger output signal as well as a request "reset the process x" to the startup section 14 according to FIG. 6, the latter subsequently stopping the process x via the operating system and subsequently restarting it. After the restart of the process x, a check is carried out to see whether the resetting was successful and, if this happens not to have been the case, the software error handling section 4 is correspondingly informed, which leads to an updating of the error message tables and to the determination of a required, more extensive reset step up to a restart of the overall process or even of the higher-ranking processor system.

The section 11 thereby generally determines the startup level to be implemented for the error messages as well as the filter information that are utilized for the collection of error indications. Further, the section 11 contains at least one error message table for statistical enumeration of error messages over respectively predetermined time spans that are determined as monitoring intervals. When a counter reading of a counter for a respective process reaches or exceeds a predetermined value, this is classified as reaching the threshold. When such a threshold is reached, a decision is made with respect to the startup level and the filters to be utilized.

The section 11 thereby receives the error message information from the control means 10, this error message information being composed of an event identifier, the type of message, the minimum startup level and a time particular. The time particular is a relative numerical value having a graduation from 1 ms. Dependent on the type of error, a minimally required startup level is applied to all error messages that require an immediate recovery reaction. This minimum startup level is reported from the control means 10 to the section 11. By contrast, all error messages that do not require immediate reset action (SWERRs and SUP_SWERRs) are counted in the specific error message table, whereby the error message tables for the error messages SWERR are maintained on the process identifier base (PID base) and the error message tables for error messages SUP_SWERR are maintained on the module name base. When a counter for the error messages SWERR or SUP_SWERR of a process reaches a threshold, a minimum startup level as shown in FIG. 3 is allocated to these error messages. All error messages SWERR characterized by a process identifier are thus counted in the PID counters respectively allocated to this process identifier. Error messages SUP_SWERR are processed in the same way. When an error message SUP_SWERR contains a process identifier PID indicating a process classified as suspected of being faulty, the counter for the process identifier PID in the SWERR error message table is thereby also incremented. Additionally, all error messages SWERR or SUP_SWERR are respectively summed up for the entire, respectively allocated processor.

The startup level to be ultimately selected for the error elimination is also checked on the basis of startup tables that contain the statistical information and the history for the earlier error elimination attempts and startup levels thereby utilized. Further, respectively specific filter tables are provided for the error message types SWERR, SUP_SWERR, SWINC and SUP_SWINC that offer filters for the collection of error indications for better error recognition. When a filter is active, no error indications are collected for these error messages, so that the plurality of error indications is limited. The error messages are counted in the filtered tables per process identification PID or, respectively, per module name during a monitoring interval and filters are activated when predetermined thresholds are reached. A global filter is activated when the plurality of error messages in one of the respective error message types reaches the threshold provided for this filter during the monitoring interval, so that error indications are then no longer collected.

Figure 7:
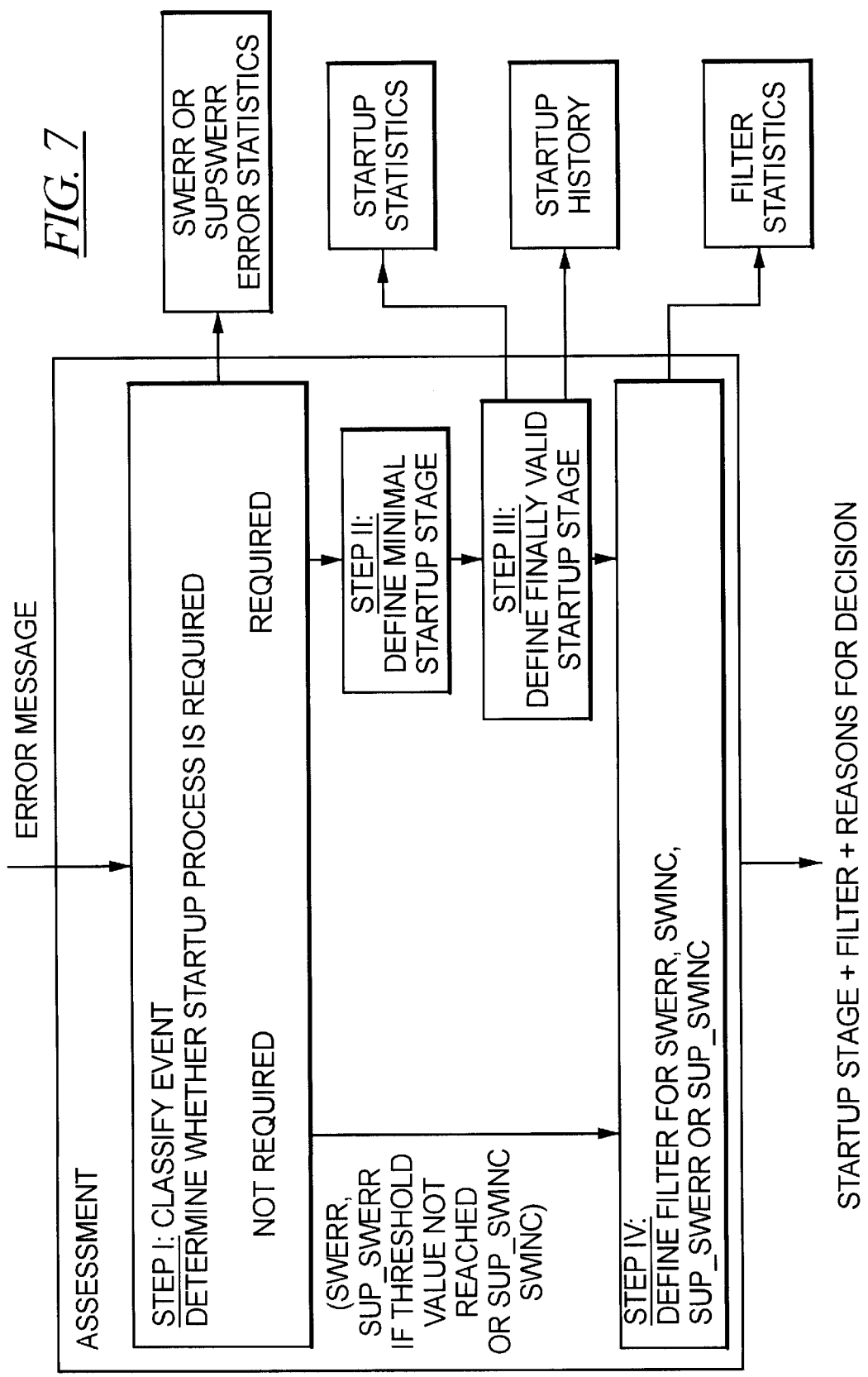
FIG. 7 shows a flow chart for the processing in the software error handling sections.

In the form of a schematic flow chart, FIG. 7 shows the functioning of an exemplary embodiment of an inventive method that sequences in the section 11. Upon reception of an error message, the event is classified in a step i and the error message type is identified and a check is also carried out to see whether a startup event is required. A startup event is thereby never required in the case of an error message SWINC or SUP_SWINC. In the case of an error message SWERR or SUP_SWERR, the process identifier PID or the module name and the time particular are handed over to the corresponding error message table (statistics) that generates an answerback when the predetermined threshold for this process identifier PID or the module name has been reached. This meaning that a startup event is required for this error message. When an error message SUP_SWERR contains a process identifier indicating a process reported as faulty, the value stored in the error message table for this report process is called in order to thereby check whether the threshold has been reached for this reported process. A startup event is always implemented given all other error message types. When no valid time indication is available, the most recent valid time indication deriving from an earlier call of the section 11 is used insofar as possible or the time indication "0" is attached.

In a Step II, the minimum startup level for an error message requiring a startup is determined on the basis of the table shown in FIG. 3.

In a Step III, the startup level to be actually selected is determined on the basis of the previous startup events and startup statistics.

In a Step IV, the corresponding filter statistics (filter tables) for the acquisition of additional error indications are selected for the respective error message SWERR, SWINC, SUP_SWERR or SUP_SWINC. At the end of the determined startup level, information about the selected filters and the reasons for the decision, which contain the reasons for the selection of the filter and of the startup level, are answered back to the control means 10.

The error message tables for the error message SWERR respectively receive the process identifier PID and the time particular of an error message SWERR as current time particular from the section 11, whereby a determination is made on the basis of these values whether a specific value for this process identifier or the reported processor has been reached for this specific error message. The result of the determination is reported to the section 11.

The error message table for the error messages SWERR is organized on the basis of the processor identifiers PID with the structure shown in FIG. 8. The error message table shown in FIG. 8 is constructed in the form of PID elements 20, 21, 22, etc., that are respectively allocated to a reported process. As is also shown in FIG. 8, an error message table is also provided for the overall processor, error messages SWERR for the respective processor being stored therein.

In the illustrated exemplary embodiment, the error message table for the error messages SWERR can store up to 100 error messages SWERR for different process identifiers PID. A table element for a processor identifier PID is thereby only occupied when an error message SWERR is active for this process identifier, i.e. was reported at least once.

As can be seen from FIG. 8, the error message table for each acquired process identifier PID contains a PID element 20, 21, 22, etc., respectively having a number of time particulars. The time particular for each error message SWERR is stored and then checked with the monitoring interval. The plurality of error messages SWERR that have occurred during the respective monitoring interval is automatically determined while summing up the plurality of time particulars stored for this process identifier PID. In addition to the time particulars, the task counter of the corresponding process identifier PID can also be stored, over and above this. This can be provided for distinguishing between "fast" processes (that manipulate a great quantity of messages per second) and "slow" processes. Each time when an access to an element (for storing or for reading) is required, the section 11 first checks all elements already existing in order to find out whether a PID element is already provided for the indicated process identifier PID or, otherwise, in order to find a free element. Older table elements that lie outside the monitoring interval, i.e. derive from an even earlier monitoring interval, are thereby deleted.

The oldest time particular of the table for the process identifier PID in question is compared to the monitoring interval and deleted when the condition cited below is met:
(Time particular$_{current}$–time particular$_{oldest}$)>Monitoring interval This procedure is repeated until the oldest time particular no longer meets the condition. Given occurrence of a new error message, the monitoring interval for the process identifier PID in question is thus referred to the most current time particular and all earlier messages outside this monitoring interval are eliminated. The corresponding time particular is stored in the table for each new error message SWERR for the corresponding process identifier PID. If it happens to be the first error message SWERR for this specific process identifier PID, a new PID element is assigned.

The plurality of respectively existing time particulars for the specific process identifier PID (after elimination of the earlier time particulars outside the monitoring interval) is compared to a predetermined value. When it thereby derives that the threshold has been reached, the section 11 is informed.

In addition to the check as to whether a "normal" has been reached, a specific check occurs to see whether more than, for example, ten events are present within the monitoring interval. The task counter is used in this check in order to recognize how many tasks this process handled within the monitoring interval. When it turns out that more than 40% of the tasks have lead to error messages SWERR, the section 11 is informed that this threshold is reached, so that correspondingly adapted countermeasures can be undertaken.

The error message tables for the error messages SUP_SWERR are organized on the basis of module names but are otherwise identically constructed and structured as shown in FIG. 8 and explained above.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for recognizing errors in a processor system working with a plurality of programs and which contains at least one processor, comprising the steps of:

sending information from a first program to a second program;

the second program checking the information received for an error;

if an error is detected, the second program then becomes a reporting program, classifies the first program as a faulty program, and outputs an error message to an operating system of the processor, the error message indicating information classified as faulty, the faulty program, and the reporting program;

providing the operating system with at least one error message table in which are stored a number of said error messages for programs respectively classified as faulty, each error message indicating the information classified as faulty, the faulty program, and the reporting program;

the operating system deleting error messages that are older than a specified monitoring time interval;

the operating system initiating an error elimination measure when the number of error messages reaches a threshold; and with the operating system, resetting the program classified as faulty.

2. The method of claim 1 wherein the system has a plurality of processors or processor platforms, the operating system, given an error message of a program administered by the operating system that indicates a program classified as faulty but implemented on a different processor, the outputting system outputs at least one of information to said different processor indicating the program classified faulty and information with respect thereto stored in an error message table of the operating system.

3. The method according to claim 1 wherein the error message contains a communication to the operating system that causes the operating system upon receipt of said communication to read further information that is attached to the information classified as faulty and which identifies the program to be classified as faulty.

4. A method according to claim 3 wherein the further information is a header.

5. The method according to claim 3 wherein the operating system evaluates the information identifying the program to be classified as faulty for corresponding entry in the error message table.

6. The method according to claim 3 wherein the operating system transmits the information identifying the program to be classified as faulty back to the reporting program and then receives information back therefrom in the form of the error message.

7. The method according to claim 1 wherein program identifiers for reporting programs together with a time information characterizing a point-in-time of a respective occurrence of a corresponding error message are stored in the error message table.

8. The method according to claim 1 wherein the error message contains a communication for the operating system that causes the operating system upon receipt of said communication to read further information that is attached to said information classified as faulty.

9. The method according to claim 1 wherein the operating system transmits information identifying the program classified as faulty back to the reporting program and then receives information back from the reporting program in the form of an error message.

* * * * *